United States Patent
Saito et al.

(10) Patent No.: US 11,084,252 B2
(45) Date of Patent: Aug. 10, 2021

(54) SURFACE-TREATED STEEL SHEET

(71) Applicant: NIPPON STEEL CORPORATION, Tokyo (JP)

(72) Inventors: Mamoru Saito, Tokyo (JP); Takehiro Takahashi, Tokyo (JP); Kiyokazu Ishizuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 162 days.

(21) Appl. No.: 16/489,652

(22) PCT Filed: Mar. 1, 2018

(86) PCT No.: PCT/JP2018/007782
§ 371 (c)(1),
(2) Date: Aug. 28, 2019

(87) PCT Pub. No.: WO2018/159760
PCT Pub. Date: Sep. 7, 2018

(65) Prior Publication Data
US 2019/0381765 A1    Dec. 19, 2019

(30) Foreign Application Priority Data
Mar. 2, 2017   (JP) .............................. JP2017-038958

(51) Int. Cl.
*B32B 15/01* (2006.01)
*C22C 19/03* (2006.01)
(Continued)

(52) U.S. Cl.
CPC ............ *B32B 15/015* (2013.01); *C22C 19/03* (2013.01); *C22C 38/001* (2013.01);
(Continued)

(58) Field of Classification Search
None
See application file for complete search history.

(56) References Cited

U.S. PATENT DOCUMENTS

| 8,734,961 | B2 * | 5/2014 | Takamatsu | ............. B21D 51/26 428/679 |
| 8,993,118 | B2 * | 3/2015 | Hirano | .................. C23C 28/021 428/632 |

(Continued)

FOREIGN PATENT DOCUMENTS

| JP | 3-17916 B2 | 3/1991 |
| JP | 2009-129664 A | 6/2009 |

(Continued)

OTHER PUBLICATIONS

International Search Report for PCT/JP2018/007782 dated May 1, 2018.

(Continued)

*Primary Examiner* — Daniel J. Schleis
(74) *Attorney, Agent, or Firm* — Birch, Stewart, Kolasch & Birch, LLP.

(57) ABSTRACT

A surface-treated steel sheet according to an aspect of the present invention includes: a steel sheet as a base metal and a coating layer, in which the coating layer includes a Ni—Co alloy coating layer, a Ni—Fe alloy layer, and a Ni layer, in the coating layer, a total adhesion amount of Co is 0.2 g/m² to 2.3 g/m², and a total adhesion amount of Ni is 8.9 g/m² or more, the Ni layer has a thickness of 0.3 μm to 3.0 μm, an atomic concentration of Co on a surface of the Ni—Co alloy coating layer is 20 at % to 70 at %, and a Co concentration gradient y in the coating layer in a depth direction is 50 mass %/μm to 400 mass %/μm.

12 Claims, 1 Drawing Sheet

(51) Int. Cl.

| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C25D 3/12* | (2006.01) |
| *C25D 5/12* | (2006.01) |
| *C25D 5/50* | (2006.01) |
| *C25D 7/00* | (2006.01) |
| *H01M 50/124* | (2021.01) |

(52) U.S. Cl.
 CPC .......... *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C25D 3/12* (2013.01); *C25D 5/12* (2013.01); *C25D 5/50* (2013.01); *C25D 7/00* (2013.01); *H01M 50/124* (2021.01); *H01M 50/1245* (2021.01); *B32B 2457/10* (2013.01); *Y10T 428/12937* (2015.01)

(56) References Cited

U.S. PATENT DOCUMENTS

| | | | |
|---|---|---|---|
| 9,017,862 B2* | 4/2015 | Horie | C22C 19/00 |
| | | | 429/176 |
| 2012/0009464 A1 | 1/2012 | Nakazawa et al. | |
| 2013/0209867 A1* | 8/2013 | Minagi | C25D 7/00 |
| | | | 429/176 |
| 2014/0050971 A1 | 2/2014 | Tomomori et al. | |

FOREIGN PATENT DOCUMENTS

| | | |
|---|---|---|
| JP | 2012-48958 A | 3/2012 |
| JP | 2015-76151 A | 4/2015 |
| WO | WO 2010/113502 A1 | 10/2010 |
| WO | WO 2012/147843 A1 | 11/2012 |

OTHER PUBLICATIONS

Péter et al., "On the composition depth profile of electrodeposrted Fe—Co—Ni alloys", Electrochimica Acta, Apr. 2, 2010, vol. 55, No. 16, pp. 4734-4741.

Written Opinion of the International Searching Authority for PCT/JP2018/007782 (PCT/ISA/237) dated May 1, 2018.

* cited by examiner

SURFACE-TREATED STEEL SHEET

TECHNICAL FIELD OF THE INVENTION

The present invention relates to a surface-treated steel sheet.

Priority is claimed on Japanese Patent Application No. 2017-038958, filed on Mar. 2, 2017, the content of which is incorporated herein by reference.

RELATED ART

In the related art, a Ni-coated steel sheet is used as a surface-treated steel sheet for battery containers. Ni-coated steel sheets are used in various battery containers such as battery cans of alkaline manganese dry batteries, lithium-ion batteries, nickel-hydrogen batteries, and the like because of the excellent chemical stability of Ni. There are two procedures as a Ni coating method for producing a Ni-coated steel sheet which is the surface-treated steel sheet for battery containers. That is, there are a method of performing barrel coating after making a can and a method of continuously coating a steel strip before making a can. Among these, since the method of continuously coating a steel strip before making a can is advantageous in terms of manufacturing costs and coating uniformity, there are increasing cases where a Ni-coated steel sheet is subjected to deep drawing press working to be filled with a positive electrode material, a negative electrode material, an alkaline electrolyte, and the like and is used in a positive electrode can which is a container that doubles as a terminal of a positive electrode, or the like.

In a case of using the Ni-coated steel sheet, for example, as a cathode electrode can of a general alkaline battery, in order to enhance discharge characteristics, a conductive coating containing graphite is applied to the inner surface of the cathode electrode so that it can maintain contact with a positive electrode mixture. However, the use of an organic solvent-based coating causes environmental pollution, and the use of a water-based coating causes energy consumption for drying. In addition, in a case of using the Ni-coated steel sheet as a cathode electrode can, it is said that the oxidation of Ni occurs with time, the contact resistance increases, and the discharge characteristics decrease.

It is said that the problems of the Ni-coated steel sheet are solved or improved in a case where a Ni coating layer is further coated with a Co coating layer and is used for the inner surface of a positive electrode can of an alkaline battery. Patent Document 1 (Japanese Unexamined Patent Application, First Publication No. 2009-129664) proposes a positive electrode can in which a 0.05 to 0.10 μm-thick Co coating layer is formed on an upper surface of a Ni coating layer on the inner surface regarding the problem of the decrease in discharge characteristics due to oxidation of the Ni coating layer.

Patent Document 2 (Japanese Unexamined Patent Application, First Publication No. 2012-48958) proposes an alkaline battery capable of maintaining better discharge characteristics in which the inner surface of a positive electrode can is formed with a multi-layer coating of a Ni coating and a Ni—Co alloy coating, the thickness of the Ni—Co alloy coating is set to 0.15 to 0.25 μm, and the proportion of Co in the alloy is set to 40% to 60%.

Patent Document 3 (PCT International Publication No. WO2012/147843) points that in a case where a coated steel sheet in which a Ni coating layer subjected to Co coating is used as a container of a battery using a strong alkaline electrolyte, Co is eluted as time elapses and it is difficult to maintain battery characteristics, and describes that it is appropriate to form the outermost layer area of the coating layer as a Ni—Co alloy layer and control a Co/Ni value on the surface of the Ni—Co alloy layer obtained by Auger electron spectroscopy to be in a range of 0.1 to 1.5.

Patent Document 4 (Japanese Examined Patent Application, Second Publication No. H3-17916) discloses a cold-rolled steel strip in which a 0.01 to 1.0 μm-thick Co coating layer is formed after forming a 1 to 6 μm-thick Ni coating layer and is thereafter heat-treated at 580° C. to 710° C.

PRIOR ART DOCUMENT

Patent Document

[Patent Document 1] Japanese Unexamined Patent Application, First Publication No. 2009-129664
[Patent Document 2] Japanese Unexamined Patent Application, First Publication No. 2012-48958
[Patent Document 3] Pamphlet of PCT International Publication No. WO2012/147843
[Patent Document 4] Japanese Examined Patent Application, Second Publication No. H3-17916

DISCLOSURE OF THE INVENTION

Problems to be Solved by the Invention

A surface-treated steel sheet for an alkaline battery can is required to have both discharge characteristics and liquid leakage resistance as a positive electrode current collector. In a case of using a Ni—Co coating on the inner surface of the can, compared to a case of using a Ni coating, there is an effect of suppressing an increase in charge transfer resistance between the inner surface of the can and a cathode electrode material due to storage and suppressing a decrease in the output of the battery, thereby improving discharge characteristics. In order to suppress the increase in charge transfer resistance with time, it is considered that the surface Co atomic concentration of the coating needs to be 20 at % or more. On the other hand, since Co is easily dissolved in alkali, if the surface Co concentration is too high, dissolution of Co promotes dissolution of Zn of an anode electrode material, and generation of gas caused by the dissolution may cause liquid leakage from the battery. Therefore, in the surface-treated steel sheet, it is necessary to adjust the surface layer Co concentration to an optimum level that can achieve both the suppression of the increase in charge transfer resistance and the suppression of dissolution of Co.

Furthermore, when the coating cracks during processing of the battery can and the base metal is exposed, the liquid leakage resistance is reduced due to the dissolution of Fe. Therefore, it is necessary for the surface-treated steel sheet to secure workability in which the coating does not crack even when processed into a battery can. However, in Patent Documents 1 to 4, sufficient studies have not been made from the viewpoint of can workability of a steel sheet.

The present inventors conducted studies and found that the coated steel sheets disclosed in Patent Documents 1 to 4 have large variations in battery performance after working. As a result of investigating the causes, it was found that depending on the press working method at the time of forming the battery can, cracking occurs in the coating of these coated steel sheets, the base metal is exposed and dissolved, and the battery performance deteriorates.

Therefore, an object of the present invention is to provide a surface-treated steel sheet having excellent workability while maintaining discharge characteristics and liquid leakage resistance.

Means for Solving the Problem

The gist of the present invention is as follows.

(1) According to an aspect of the present invention, a surface-treated steel sheet includes: a steel sheet as a base metal; a coating layer including Ni, Co, Fe and impurities provided on a surface of the steel sheet as the base metal, in which the coating layer includes a Ni—Co alloy coating layer which is a region between a position where a mass concentration of Co becomes maximum and a position where the mass concentration of Co becomes 8 mass % for the first time, which are specified by performing line analysis on a cross section of the coating layer in a direction from the surface of the surface-treated steel sheet toward the steel sheet as the base metal with energy dispersive X-ray spectroscopy, a Ni—Fe alloy layer which is a region between a position where a mass concentration of Fe becomes 8 mass % for the first time and a position where a mass concentration of Ni and the mass concentration of Fe become the same for the first time, which are specified by performing the line analysis on the cross section of the coating layer in the direction from the surface of the surface-treated steel sheet toward the steel sheet as the base metal with the energy dispersive X-ray spectroscopy, and a Ni layer which is present between the Ni—Co alloy coating layer and the Ni—Fe alloy layer, in the coating layer, a total adhesion amount of Co is 0.2 g/m² to 2.3 g/m², and a total adhesion amount of Ni is 8.9 g/m² or more, the Ni layer has a thickness of 0.3 μm to 3.0 μm, an atomic concentration of Co specified by analyzing a surface of the Ni—Co alloy coating layer with X-ray photoelectron spectroscopy is 20 at % to 70 at %, and a Co concentration gradient y in the coating layer in a depth direction obtained by substituting Ip, $I_{1/5}$ and Δx, which are specified by performing the line analysis on the cross section of the coating layer with the energy dispersive X-ray spectroscopy, into Formula (1) is 50 mass %/μm to 400 mass %/μm, $$y=(Ip-I_{1/5})/(\Delta x) \quad (1)$$

where, Ip: a peak mass concentration of Co, specified by the line analysis, $I_{1/5}$: a mass concentration of ⅕ of Ip, $\Delta x = X_{1/5} - Xp$, Xp: a depth by unit μm of a position where the mass concentration of Co is Ip, specified by the line analysis, $X_{1/5}$: a depth by unit μm of a position where the mass concentration of Co becomes $I_{1/5}$ for the first time on a side closer to the steel sheet as the base metal than Xp, specified by the line analysis, and an origin of depth measurement for both $X_{1/5}$ and Xp is set to the surface of the coating layer.

(2) In the surface-treated steel sheet according to (1), the total adhesion amount of Co in the coating layer may be 0.4 g/m² or more.

(3) In the surface-treated steel sheet according to (1) or (2), the thickness of the Ni layer may be 2.0 μm or less.

(4) In the surface-treated steel sheet according to any one of (1) to (3), the total adhesion amount of Co in the coating layer may be 0.4 g/m² to 1.8 g/m².

(5) In the surface-treated steel sheet according to any one of (1) to (4), the total adhesion amount of Ni in the coating layer may be 9.5 g/m² to 17 g/m².

(6) In the surface-treated steel sheet according to any one of (1) to (5), the atomic concentration of Co on the surface of the Ni—Co alloy coating layer may be 30 at % to 60 at %.

(7) In the surface-treated steel sheet according to any one of (1) to (6), the Co concentration gradient y in the coating layer in the depth direction may be 110 to 300.

Effects of the Invention

The surface-treated steel sheet of the present invention has high discharge characteristics and liquid leakage resistance, and also has excellent workability. For example, in a case where the surface-treated steel sheet of the present invention is applied to a battery can, the coating layer is less likely to crack while securing battery performance even in a case where working conditions for the battery can are severe, which contributes to quality stabilization of the battery and a reduction in cost by the improvement in yield. Therefore, the present invention can contribute to the development of industry.

EMBODIMENTS OF THE INVENTION

Figure 1:
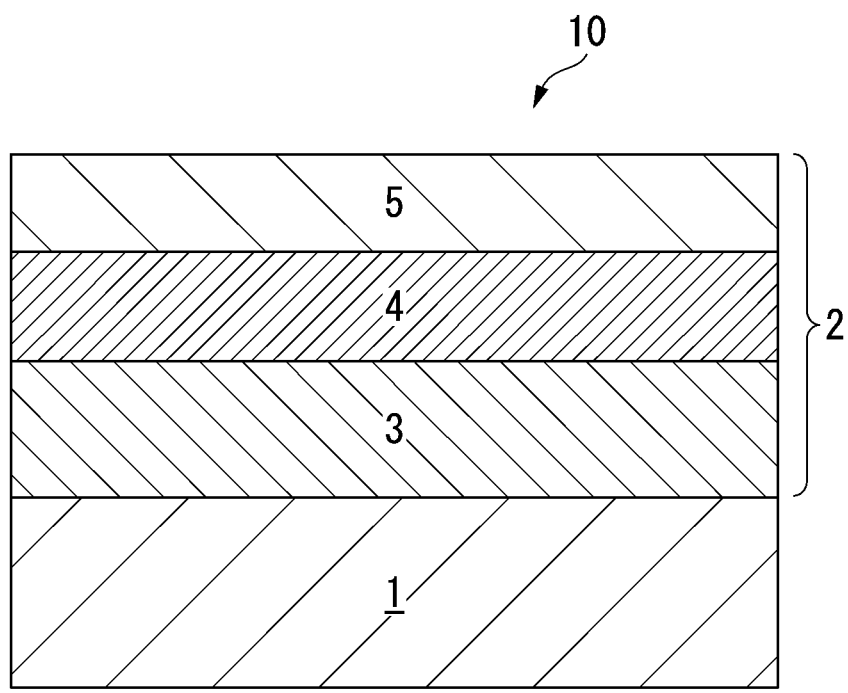
FIG. 1 is a schematic view of a cross section showing a surface-treated steel sheet according to an embodiment.

The present inventors repeated studies on surface-treated steel sheets having excellent workability while maintaining discharge characteristics and liquid leakage resistance. As a result, the present inventors found that by optimizing the coating configuration, particularly the concentration gradient of Co in the depth direction, it is possible to improve the workability while securing the battery performance of the surface-treated steel sheet. Specifically, it was found that, by leaving a soft Ni layer in an intermediate layer of a coating, it is possible to obtain a coating that is less likely to crack even under severe working conditions. Furthermore, it was found that by causing the atomic concentration of Co on the surface of a Ni—Co alloy coating layer of a coating to be 20 at % to 70 at %, forming a specific Co concentration gradient of the coating in the depth direction, and forming a Ni layer in a lower layer of the Ni—Co alloy coating layer, it is possible to obtain a surface-treated steel sheet having excellent workability while maintaining the discharge characteristics and the liquid leakage resistance.

A schematic view of a cross section showing a surface-treated steel sheet according to the present embodiment based on the above knowledge is illustrated in FIG. 1. A surface-treated steel sheet 10 according to the present embodiment includes a steel sheet as a base metal 1 and a coating layer 2 containing Ni, Co, Fe, and impurities formed on the steel sheet as the base metal 1. The impurities of the coating layer 2 are substances incorporated in the coating layer 2 and mean those acceptable in a range which does not adversely affect the surface-treated steel sheet 10 according to the present embodiment. Examples of the element that may be contained in the coating layer 2 as the impurities include H, O, C, B, S, and Cl.

The coating layer 2 includes a Ni—Fe alloy layer 3, a Ni layer 4, and a Ni—Co alloy coating layer 5 in order from the surface side of the steel sheet as the base metal 1. In the surface-treated steel sheet 10 according to the present embodiment, the Ni—Co alloy coating layer 5 is defined as a region between a position where the mass concentration of Co becomes maximum and a position where the mass concentration of Co becomes 8 mass % for the first time, which are specified by performing line analysis on a cross section of the coating layer 2 in a direction from the surface of the surface-treated steel sheet 10 toward the steel sheet as the base metal 1 with energy dispersive X-ray spectroscopy (EDX). The Ni—Fe alloy layer 3 is defined as a region between a position where the mass concentration of Fe becomes 8 mass % for the first time and a position where the mass concentration of Ni and the mass concentration of Fe become the same for the first time, which are specified by performing line analysis on the cross section of the coating layer 2 in the direction from the surface of the surface-treated steel sheet 10 toward the steel sheet as a base metal 1 with the energy dispersive X-ray spectroscopy. The Ni layer 4 is defined as a layer present between the Ni—Co alloy coating layer 5 and the Ni—Fe alloy layer 3. Details of the cross-sectional analysis with EDX will be described later. There may be cases where, in the surface-treated steel sheet 10 according to the present embodiment, a natural oxide film or the like is formed on the surface of the Ni—Co alloy coating layer 5.

Although the steel sheet as a base metal 1 of the surface-treated steel sheet 10 according to the present embodiment is not necessarily limited, a steel sheet of aluminum-killed (Al-killed) steel or ultra low carbon steel (for example, ultra low carbon Ti-added steel, ultra low carbon Nb-added steel, or ultra low carbon Ti—Nb-added steel), which is typically used, can be used as the material thereof. Furthermore, a steel sheet to which an appropriate amount of elements Si, Mn, and P is added as a strengthening element, or a steel sheet to which B is added as a grain boundary strengthening element can be used as the material of the steel sheet as the base metal 1. A cold-rolled steel sheet is typically used as the material of the steel sheet as the base metal 1 in view of the sheet thickness of the final product, but the material of the steel sheet as the base metal 1 is not limited thereto.

Hereinafter, the reasons for limitation of the surface-treated steel sheet 10 according to the present embodiment will be described.

As described above, the coating layer 2 has the Ni—Fe alloy layer 3, the Ni layer 4, and the Ni—Co alloy coating layer 5 in order from the side of the steel sheet as the base metal 1. In the coating layer 2, the total adhesion amount of Co is set to 0.2 g/m$^2$ or more. This is because, when the total adhesion amount of Co is less than 0.2 g/m$^2$, the atomic concentration of Co on the surface of the Ni—Co alloy coating layer 5, which will be described later, cannot be secured, and the discharge characteristics are decreased. On the other hand, the total adhesion amount of Co in the coating layer 2 is set to 2.3 g/m$^2$ or less. This is because, when the total adhesion amount of Co exceeds 2.3 g/m$^2$, a decrease in liquid leakage resistance and a deterioration in workability are easily incurred by the dissolution of Co. The total adhesion amount of Co in the coating layer 2 may be set to 0.4 g/m$^2$ or more, 0.6 g/m$^2$ or more, or 0.8 g/m$^2$ or more. The total adhesion amount of Co in the coating layer 2 may be set to 2.0 g/m$^2$ or less, 1.8 g/m$^2$ or less, or 1.6 g/m$^2$ or less.

In the coating layer 2, the total adhesion amount of Ni is set to 8.9 g/m$^2$ or more. This is because, when the total adhesion amount of Ni is less than 8.9 g/m$^2$, there may be cases where Fe in the steel sheet as the base metal 1 diffuses to the surface layer in the process of alloying by mutual diffusion of Co and Ni, as the results, the liquid leakage resistance is decreased, the Ni layer 4 which is soft disappears, and the workability is decreased. On the other hand, from the viewpoint of the discharge characteristics, liquid leakage resistance, and workability of the surface-treated steel sheet 10, it is considered unnecessary to limit the upper limit of the total adhesion amount of Ni. However, when the total adhesion amount of Ni is too large, the coating cost is increased. Therefore, it is desirable that the total adhesion amount of Ni is set to 17.8 g/m$^2$ or less. The total adhesion amount of Ni in the coating layer 2 may be set to 9.5 g/m$^2$ or more, 11.0 g/m$^2$ or more, or 12.5 g/m$^2$ or more. The total adhesion amount of Ni in the coating layer 2 may be set to 17.0 g/m$^2$ or less, 15.0 g/m$^2$ or less, or 14.0 g/m$^2$ or less.

The total adhesion amount of Ni and the total adhesion amount of Co in the coating layer 2 can be measured by applying X-ray fluorescence analysis to the coating layer 2. For example, ZSX Primus II manufactured by Rigaku Corporation can be used for the X-ray fluorescence analysis. When a standard sample having known adhesion amounts of Ni and Co is prepared in advance and a calibration curve is created using this, it is possible to quantify the adhesion amounts of Ni and Co of a measurement object based on this calibration curve.

The atomic concentration of Co obtained by analyzing the surface of the Ni—Co alloy coating layer 5 by X-ray photoelectron spectroscopy (XPS) (hereinafter, abbreviated as "surface Co concentration") is set to 20% to 70%. When the surface Co concentration is less than 20 at %, the discharge characteristics are decreased. On the other hand, when the surface Co concentration exceeds 70 at %, the liquid leakage resistance is decreased. Therefore, in order to obtain the surface-treated steel sheet 10 excellent in both discharge characteristics and liquid leakage resistance, the surface Co concentration is set to be in a range of 20 at % to 70 at %, by atom %. The surface Co concentration may be set to 25 at % or more, 30 at % or more, or 35 at % or more. The surface Co concentration may be set to 65 at % or less, 60 at % or less, or 55 at % or less.

In the surface-treated steel sheet 10 according to the present embodiment, the surface Co concentration is measured by XPS. In the measurement by XPS, PHI 5600 manufactured by ULVAC-PHI, Inc. is used, and MgKα radiation is used as an X-ray source. In addition, in a case where stain, paint, and the like are attached to the surface of the Ni—Co alloy coating layer 5 or an oxide film or the like is formed thereon, in order to eliminate these effects, it is necessary to measure the atomic concentration of Co after sputtering the surface of the coating layer 2 of the surface-treated steel sheet 10 with Ar ions. Sputtering may be performed until the effects of the stain, oxide film, and the like disappear, and for example, sputtering may be performed to a depth of 4 nm in terms of SiO$_2$. Furthermore, the atomic concentration of Co is calculated assuming that the sum of the atomic concentrations of Ni, Co, and Fe is 100 at %. That is, the ratio of the molar amount of Co to the total molar amount of Co, Fe, and Ni on the surface of the Ni—Co alloy coating layer 5 is regarded as the atomic concentration of Co on the surface of the Ni—Co alloy coating layer 5. The atomic concentration of Fe and the atomic concentration of Ni on the surface of the Ni—Co alloy coating layer 5 are also measured in the same manner.

The atomic concentrations of Ni and Fe on the surface of the Ni—Co alloy coating layer 5 are not particularly limited. In order to further secure the liquid leakage resistance of the surface-treated steel sheet 10, the atomic concentration of Fe on the surface of the Ni—Co alloy coating layer 5 may be set to 4 at % or less, 3 at % or less, or 2 at % or less.

In the surface-treated steel sheet 10 according to the present embodiment, the Co concentration gradient y in the coating layer 2 in the depth direction is controlled from the viewpoint of securing the workability of the coating layer 2.

The concentration gradient y [mass %/μm] of Co in the coating layer 2 in the depth direction obtained by substituting Ip, $I_{1/5}$, and Δx, which are specified by performing line analysis on the cross section of the coating layer with EDX, into the following formula.

$$y=(Ip-I_{1/5})/(\Delta x)$$

In the above formula,

Ip: Peak mass concentration of Co by unit mass %, specified by line analysis, $I_{1/5}$: Mass concentration of ⅕ of Ip, $$\Delta x = X_{1/5} - Xp,$$

Xp: Depth by unit μm of the position where the mass concentration of Co is Ip, specified by line analysis, $X_{1/5}$: Depth by unit μm of the position where the mass concentration of Co becomes $I_{1/5}$ for the first time on the side closer to the steel sheet as the base metal 1 than Xp, specified by line analysis, and the origin of the depth measurement for both $X_{1/5}$ and Xp is set to the surface of the coating layer 2. As is apparent from the above definition, the concentration gradient y is the mass concentration gradient of Co.

This concentration gradient y is set to be in a range of 50≤y≤400. In a case where the concentration gradient y is less than 50, alloying of Ni and Co excessively proceeds, and the surface-treated steel sheet 10 tends to be inferior in workability. When the concentration gradient y exceeds 400, alloying of Ni and Co is insufficient, the surface layer of the coating layer 2 becomes hard, the workability is deteriorated, and the coating layer 2 is easily peeled off during working. The concentration gradient y may be set to 70 or more, 90 or more, or 110 or more. The concentration gradient y may be set to 350 or less, 320 or less, or 300 or less.

The Co concentration gradient y in the coating layer 2 in the depth direction is obtained by measuring the cross section of the coating layer 2 by energy dispersive X-ray spectroscopy (EDX, for example, SEM-EDX). The specific measurement procedure is as follows. First, the surface-treated steel sheet 10 is embedded in a resin. Next, a cross section perpendicular to the surface of the surface-treated steel sheet 10 is formed, which is used as an inspection surface and mirror-polished. Thereafter, the cross section of the coating layer 2 is observed at a magnification of 10,000-fold and EDX line analysis is performed on a range from the resin side (that is, the surface side of the surface-treated steel sheet 10) to the steel sheet as the base metal 1 side. At this time, the acceleration voltage is set to 15 kV, the irradiation current is set to 10 nA, the measurement pitch is set to 0.025 μm, and the aperture diameter of the objective lens is 30 μmφ. Assuming that the sum of the mass concentrations of Ni, Co, and Fe as 100%, the mass concentration of each element is calculated. That is, the ratio of the mass of Co to the total mass of Ni, Co, and Fe at the measurement point is regarded as the mass concentration of Co at the measurement point. The same applies to the mass concentrations of Ni and Fe. The same measurement is performed from the surface side of the surface-treated steel sheet 10, the mass concentration of Co at the position where the mass concentration of Co is the highest is referred to as Ip, and the depth of this position is referred to as Xp. EDX line analysis is performed on a range from the position where the mass concentration of Co is the highest (the peak mass concentration position of Co) to the steel sheet as the base metal 1 side, and the depth of the position where the mass concentration of Co is coincident with ⅕($I_{1/5}$) of Ip for the first time is referred to as $X_{1/5}$. In addition, the origin of the depth measurement of these positions is referred as the surface of the coating layer 2. The surface of the coating layer 2 in this measurement is defined as the interface between the resin and the sample when the sample embedded in the resin is observed from the cross section.

The thicknesses of the Ni—Co alloy coating layer 5 and the Ni layer 4 and the Ni—Fe alloy layer 3 thereunder are measured by SEM-EDX in the cross section perpendicular to the surface of the surface-treated steel sheet 10 as described above. The Ni—Co alloy coating layer 5 refers to, in the thickness measurement, a range from the surface of the coating layer 2 to [when EDX line analysis is performed on a range from the resin side to the steel sheet as the base metal 1 side, the position where the mass concentration of Co in the coating layer becomes 8 mass % for the first time after passing through the position where the mass concentration of Co becomes Ip]. Although the position where the mass concentration of the coating layer Co becomes Ip is substantially coincident with the surface of the coating layer 2, a case where an oxide film or the like is formed on the surface of the coating layer 2 is excluded. The Ni—Fe alloy layer 3 refers to, in the thickness measurement, a range from [when EDX line analysis is performed on the range from the resin side to the steel sheet as the base metal 1 side, the position where the mass concentration of Fe in the coating layer becomes 8 mass % for the first time] to [when EDX line analysis is performed on the range from the resin side to the steel sheet as the base metal 1 side, the position where the mass concentration of Ni and the mass concentration of Fe become the same for the first time]. The layer between the Ni—Co alloy coating layer and the Ni—Fe alloy layer is referred to as the Ni layer. By obtaining the depths of these positions, the thickness of each layer can be obtained.

The thickness of the Ni—Co alloy coating layer 5 is not particularly limited as long as the total adhesion amount of Co, the Co concentration gradient y, and the like are controlled within the ranges described above. In a case where the surface-treated steel sheet 10 according to the present embodiment is manufactured under manufacturing conditions that can achieve the various requirements described above, the thickness of the Ni—Co alloy coating layer 5 is approximately in a range of 0.1 μm to 1.5 μm. The thickness of the Ni—Co alloy coating layer 5 may be set to 0.2 μm or more, or 0.5 μm or more. The thickness of the Ni—Co alloy coating layer 5 may be set to 1.2 μm or less, 1.0 μm or less, or 0.8 μm or less.

The presence of the soft Ni layer 4 can impart the followability to the steel sheet as the base metal 1 during working of the surface-treated steel sheet 10 to the coating layer 2 such that the coating layer 2 is less likely to crack. As a result of intensive examinations by the inventors, it was found that the optimum thickness of the Ni layer 4 for workability is in a range of 0.3 μm to 3.0 μm. When the thickness of the Ni layer 2 is less than 0.3 μm, the above-described effects cannot be sufficiently obtained. The thickness of the Ni layer 2 is more preferably 0.5 μm or more, 0.8 μm or more, or 1.0 μm or more. On the other hand, from the viewpoints of discharge characteristics, liquid leakage resistance, and workability of the surface-treated steel sheet 10, it is considered unnecessary to limit the upper limit of the thickness of the Ni layer 2. However, when the thickness of the Ni layer 2 is more than 3.0 μm, the cost is increased with the increase in thickness. The thickness of the Ni layer 4 is more preferably 2.0 μm or less, and even more preferably 1.5 μm or less.

The Ni—Fe alloy layer 3 is formed by a heat treatment after Ni coating and Co coating. The Ni—Fe alloy layer 3 has an effect of improving the adhesion of the coating layer 2. The thickness of the Ni—Fe alloy layer 3 is not particularly limited. In a case where the surface-treated steel sheet 10 according to the present embodiment is manufactured under manufacturing conditions that can achieve the various requirements described above, the thickness of the Ni—Fe alloy layer 3 is approximately in a range of 0.3 μm to 1.5 μm.

Next, a method of manufacturing the surface-treated steel sheet 10 according to the present embodiment will be described. The manufacturing method includes 1. Ni coating, 2. Co coating, and 3. alloying treatment. In order to obtain the coating layer 2 of the surface-treated steel sheet 10 according to the present embodiment, it is necessary to cause all of the Ni coating thickness, Ni coating conditions, Co coating thickness, Co coating conditions, and alloying treatment conditions to be within appropriate ranges. The Ni coating mentioned here is Ni coating before the alloying treatment, and is distinguished from the Ni layer 4 of the surface-treated steel sheet 10 according to the present embodiment after the alloying treatment.

The Ni coating thickness is considered to affect the thickness of the intermediate layer in the coating layer 2 of the surface-treated steel sheet 10, that is, the thickness of the Ni layer 4. The Ni coating conditions are considered to affect the atomic concentration of Co on the surface of the Ni—Co alloy coating layer 5, the Co concentration gradient y, the thickness of the Ni layer 4, and the thickness of the Ni—Fe alloy layer 3. The Co coating thickness is considered to affect the atomic concentration of Co on the surface of the Ni—Co alloy coating layer 5 and the Co concentration gradient y. The Co coating conditions are considered to affect the atomic concentration of Co on the surface of the Ni—Co alloy coating layer 5, the Co concentration gradient y, and the thickness of the Ni layer 4. The alloying treatment conditions are considered to affect the atomic concentration of Co on the surface of the Ni—Co alloy coating layer 5, the Co concentration gradient y, the thickness of the Ni layer 4, and the thickness of the Ni—Fe alloy layer 3.

It is presumed that as the mechanism by which the Ni coating conditions and the Co coating conditions affect the coating structure, the coating conditions affect the amount of coating strain before the alloying treatment, and the amount of coating strain affects the Ni—Co diffusion rate and the Ni—Fe diffusion rate. It is considered that a coating condition that most significantly affects the amount of coating strain is the type of plating bath.

In order to cause the atomic concentration of Co on the surface of the Ni—Co alloy coating layer 5 and the Co concentration gradient y to be within the above-mentioned ranges, a condition that introduces a larger coating strain than usual may be applied to the plating bath. In a case where the amount of coating strain is within the typical range, the diffusion rate at the time of the alloying treatment of a coating constituent element becomes small, and it becomes difficult to obtain the coating layer 2 of the surface-treated steel sheet 10 according to the present embodiment.

As typical plating baths with small coating strain, a Watts bath (a composite bath of sulfate ions and chloride ions), a sulfamic acid bath, and the like are well known. In general, the smaller the amount of coating strain, the better the uniformity and coatability of a coating, and the smaller the coating damage at the time of working of a coated steel sheet. Therefore, in a general method of manufacturing a coated steel sheet, it is desired to minimize the amount of coating strain. However, in the method of manufacturing the surface-treated steel sheet 10 according to the present embodiment, it is necessary to increase the amount of coating strain before the alloying treatment for the above-described reason.

It is considered that when Ni and Co deposit as coatings, Ni and Co deposit via some reaction intermediates generated by the interaction between these metal ions and components in the plating bath. It is considered that the structures of the reaction intermediates affect the exchange current density at the time of metal precipitation, the exchange current density of the hydrogen electrode reaction, and the like, and as a result, also affects the amount of coating strain. In a case where a Watts bath is exemplified, for example, it is considered that due to the coexistence of sulfate ions and chloride ions, NiCl adsorbed atom exists as the reaction intermediate, and thus the coating strain is reduced. On the other hand, although the mechanism is not clear, as a plating bath with which an appropriate amount of coating strain for the surface-treated steel sheet 10 according to the present embodiment is obtained, for example, a sulfuric acid bath, an all-chloride bath, and baths containing organic or inorganic additives for increasing strain in these baths, and the like can be used.

It is considered that in a case where a larger coating strain than usual is introduced to both Ni coating and Co coating, there are cases where the Ni—Fe alloy layer 3 becomes too thick and the Ni layer 4 disappears depending on the alloying treatment conditions and the like. In addition, in a case where an organic additive or an inorganic additive is contained in a Ni plating bath, it is considered that there are cases where these co-precipitate in the coating layer and reduce the corrosion resistance of the surface-treated steel sheet 10. From this, it is preferable to apply a coating condition under which the amount of typical strain is small to the Ni coating, and applying a coating condition under which the amount of strain is larger than usual only to the Co coating.

Hereinafter, the most preferable manufacturing conditions will be described. First, a Ni coating layer is formed on the surface of the steel sheet as the base metal 1 by electro plating using a Ni plating bath. As the Ni plating bath, a plating bath typically used for Ni coating, such as a Watts bath, a sulfamic acid bath, and a borofluoride bath can be used. For example, the Ni coating layer can be formed by using, as a Watts bath, a bath having a bath composition of $NiSO_4.6H_2O$: 250 g/L to 380 g/L, $NiCl_2.6H_2O$: 40 g/L to 80 g/L, and $H_3BO_3$: 20 g/L to 55 g/L under conditions of pH: 3.5 to 4.5, a bath temperature of 45° C. to 65° C., and a current density of 1 $A/dm^2$ to 40 $A/dm^2$.

Subsequently, a Co coating layer is formed on the Ni coating layer by performing Co coating on the steel sheet as the base metal 1 on which the Ni coating layer is formed. In the Co coating, not a general Co plating bath but a Co plating bath in which the amount of coating strain is large is used. The Co plating bath is, for example, a Co sulfate bath, or an all-chloride Co bath. Furthermore, a bath containing an organic additive and/or an inorganic additive therein may be used.

The Co sulfate bath is a bath that primarily contains Co sulfate, and contains boric acid, sulfuric acid, or salts thereof as necessary, and contains no chloride ions in an amount regarded as an impurity. Here, the amount of chloride ions regarded as an impurity is, for example, 500 ppm or less.

The all-chloride Co bath is a bath that is substantially composed solely of Co chloride, or a bath that contains Co chloride and other chlorides (for example, Na chloride, K chloride, and ammonium chloride) in combination and further contains boric acid, hydrochloric acid, and the like as necessary, and is a bath that does not contain sulfate ions in an amount regarded as an impurity or more. Here, the amount of sulfate ions regarded as an impurity is, for example, 500 ppm or less.

As the organic additive and the inorganic additive, for example, formic acid, acetic acid, propionic acid, and oxalic acid, and salts thereof, or formaldehyde, methanol, ethanol, acetaldehyde, propanol, propionaldehyde, ethylene glycol, glycol aldehyde, and hydrogen peroxide can be used.

As a more preferable example, for example, the Co coating layer can be formed by using a Co plating bath having a bath composition of $CoSO_4.7H_2O$: 240 g/L to 330 g/L, $H_3BO_3$: 20 g/L to 55 g/L, HCOOH: 15 g/L to 30 g/L, and $H_2SO_4$: 0.5 g/L to 3 g/L under conditions of a pH of 2 to 3, a bath temperature of 50° C. to 60° C., and a current density of 1 A/dm² to 40 A/dm².

Next, a treatment for forming the Ni—Co alloy coating layer 5 is performed by applying an alloying treatment to the steel sheet as the base metal 1 on which the Ni coating layer and the Co coating layer are formed to cause the Ni coating layer and the Co coating layer to thermally diffuse. In this treatment, the elements also diffuse between the Ni coating layer and the steel sheet as the base metal 1, whereby the Ni—Fe alloy layer 3 is formed. At this time, it is desirable that a continuous annealing method is used as the alloying treatment, the treatment atmosphere is set to a nitrogen-2% to 4% hydrogen atmosphere, the maximum attained temperature of the steel sheet as the base metal 1 which is coated is set to 715° C. to 900° C., and the retention time at the temperature is set to 10 seconds to 40 seconds. In a case where the Ni—Co alloy coating layer is formed by Ni—Co alloy electro coating, the structure of the coating layer 2 of the surface-treated steel sheet 10 according to the present embodiment cannot be obtained.

As described above, the surface-treated steel sheet 10 according to the present embodiment can be obtained by forming the above-described predetermined coating layer on the steel sheet as the base metal 1 and alloying the coating layer.

EXAMPLES

Next, examples of the present invention will be described. The conditions in the examples are an example of conditions adopted to confirm the feasibility and effect of the present invention. The present invention is not limited to the example of conditions. The present invention can adopt various conditions as long as the object of the present invention is achieved without departing from the scope of the present invention.

A cold-rolled steel sheet as a base metal A [Al-killed steel (sheet thickness: 0.25 mm)] (unannealed) and a steel sheet as a base metal B [ultra low carbon Ti—Nb-added steel (sheet thickness: 0.25 mm)] (unannealed) were degreased and pickled in a typical method. Thereafter, for Examples 1 to 7 and Comparative Examples 1 to 7, the steel sheet as the base metal was coated in the order of Ni electro coating according to the treatment conditions described in 1. and Co electro coating according to the treatment conditions described in 2. The steel sheet as the base metal which was coated was subjected to a heat treatment under the conditions described in 3. so that the coating was alloyed. Unless otherwise specified, a continuous annealing method was used as the heat treatment (alloying treatment). The chemical compositions (mass %, the remainder consisting of iron and impurities) of the steel sheet as the base metal A and the steel sheet as the base metal B are shown in Table 1.

TABLE 1

|  | C | Si | Mn | P | S | sol. Al | N | Ti | Nb |
|---|---|---|---|---|---|---|---|---|---|
| Steel sheet A | 0.009 | 0.006 | 0.12 | 0.012 | 0.0088 | 0.047 | 0.0025 | — | — |
| Steel sheet B | 0.0016 | 0.007 | 0.10 | 0.011 | 0.0038 | 0.033 | 0.0027 | 0.016 | 0.023 |

1. Ni Coating
(i) Bath Conditions
$NiSO_4.6H_2O$: 340 g/L
$NiCl_2.6H_2O$: 70 g/L
$H_3BO_3$: 45 g/L
(ii) Other Coating Conditions
Bath temperature: 60° C.
Cathode current density: 20 A/dm²
pH: 4.0
2. Co Coating
(i) Bath Conditions
$CoSO_4.7H_2O$: 300 g/L
$H_3BO_3$: 45 g/L
HCOOH: 23 g/L
$H_2SO_4$: 1.3 g/L
(ii) Other Coating Conditions
Bath temperature: 55° C.
Cathode current density: 20 A/dm²
pH: 2.6
3. Alloying Treatment Conditions
Atmosphere: $N_2$-2% $H_2$ atmosphere (oxygen concentration: 50 ppm or less)
Temperature rising rate: 10° C./s
Attained temperature: 600° C. to 860° C.
Retention time: 5 seconds to 3600 seconds
Cooling: $N_2$ gas cooling to 100° C.

For Example 8, the same manufacturing conditions as in Examples 1 to 7 were adopted except that the following was adopted as Co coating conditions.
(i) Bath Conditions
$CoCl_2.6H_2O$: 150 g/L
$NH_4Cl$: 250 g/L
(ii) Other Coating Conditions
Bath temperature: 50° C.
Cathode current density: 20 A/dm²
pH: 3.2

For Example 9, the same manufacturing conditions as in Examples 1 to 8 were adopted except that the following was adopted as Co coating conditions.
(i) Bath Conditions
$CoCl_2.6H_2O$: 70 g/L
HCl: 0.2 g/L
(ii) Other Coating Conditions
Bath temperature: 70° C.
Cathode current density: 5 A/dm²
pH: 2.9

For Comparative Example 8, the following manufactured conditions were adopted.

1. Ni Coating
(i) Bath Conditions
$NiSO_4 \cdot 6H_2O$: 250 g/L
$NiCl_2 \cdot 6H_2O$: 45 g/L
$H_3BO_3$: 30 g/L
pH: 4.0
(ii) Other Coating Conditions
Bath temperature: 60° C.
Cathode current density: 10 A/dm$^2$
2. Co Coating
(i) Bath Conditions
$CoSO_4 \cdot 7H_2O$: 250 g/L
$H_3BO_3$: 30 g/L
$CoCl_2 \cdot 6H_2O$: 90 g/L
(ii) Other Coating Conditions
pH: 4.3
Bath temperature: 60° C.
Cathode current density: 10 A/dm$^2$
3. Alloying Treatment Conditions
Batch type annealing furnace used
Atmosphere: 75% $H_2$—$N_2$ atmosphere
Attained temperature: 700° C.
Retention time: 3600 seconds For Comparative Example 9, the following manufactured conditions were adopted.
1. Ni Coating
(i) Bath Conditions
$NiSO_4 \cdot 6H_2O$: 225 g/L
$NiCl_2 \cdot 6H_2O$: 23 g/L
$H_3BO_3$: 41 g/L
(ii) Other Coating Conditions
pH: 3.6
Bath temperature: 60° C.
Cathode current density: 20 A/dm$^2$
2. Co Coating
(i) Bath Conditions
$CoSO_4 \cdot 7H_2O$: 300 g/L
$H_3BO_3$: 41 g/L
$CoCl_2 \cdot 6H_2O$: 50 g/L
NaCl: 23 g/L
(ii) Other Coating Conditions
pH: 3.3
Bath temperature: 60° C.
Cathode current density: 20 A/dm$^2$
3. Alloying Treatment Conditions
Batch type annealing furnace used
Atmosphere: 75% $H_2$—$N_2$ atmosphere
Attained temperature: 700° C.
Retention time: 3600 seconds For Comparative Example 10, the same manufacturing was performed under the same conditions as those of Comparative Example 8 except that instead of the batch annealing, continuous annealing with an attained temperature of 720° C., a retention time of 10 seconds, and an atmosphere of $N_2$-2% $H_2$ (oxygen concentration: 50 ppm or less) was performed.

(1) Analysis of Total Adhesion Amount of Ni and Total Adhesion Amount of Co in Coating Layer The total adhesion amount of Ni in the coating layer and the total adhesion amount of Co were measured by punching a 40 mmφ sample from the central part of the prepared surface-treated steel sheet, and evaluating the total adhesion amounts of Ni and Co using X-ray fluorescence analysis (ZSX Primus II manufactured by Rigaku Corporation) performed on the coating layer of the sample.

(2) Analysis of Atomic Concentration of Co on Surface of Ni—Co Alloy Coating Layer The atomic concentration of Co on the surface of the Ni—Co alloy coating layer was measured by punching a 10 mm×10 mm sample from the central part of the prepared surface-treated steel sheet and analyzing the sample using XPS (PHI 5600 manufactured by ULVAC-PHI, Inc.). MgKα was used as the X-ray source, and the acceleration voltage was set to 15 kV and the current value was set to 27 mA. After sputtering the surface of the sample to 4 nm in terms of $SiO_2$ using Ar ions, the composition of the surface was analyzed. In the composition analysis, the sum of the atomic concentrations of Ni, Co, and Fe was assumed to be 100 at %.

(3) Analysis of Co Concentration Gradient y in Coating Layer in Depth Direction and Thickness of Ni Layer The Co concentration gradient y in the coating layer in the depth direction was performed by punching a 10 mm×20 mm sample from the central part of the prepared surface-treated steel sheet and analyzing the cross section thereof by SEM-EDX line analysis. The short side of the sample was aligned with the direction perpendicular to the rolling direction of the steel sheet as the base metal, and the long side of the sample was aligned with the rolling direction of the steel sheet as the base metal. The sample was embedded in a resin and then cut perpendicularly to the surface, and the cut surface was mirror-polished and analyzed. In the SEM-EDX, using JSM-7000F manufactured by JEOL Ltd., line analysis was performed on the cross section of the coating layer from the resin side toward the steel sheet as the base metal side with an acceleration voltage 15 kV, an irradiation current of 10 nA, an aperture diameter of the objective lens of 30 μmφ, and a magnification of 10,000-fold. The measurement elements were Ni, Co, and Fe, and the compositions thereof were calculated assuming that the sum of the mass concentrations of Ni, Co, and Fe was 100 mass %. Based on the line analysis results, Ip, $I_{1/5}$, Xp, and $X_{1/5}$ were calculated by the above-described method, and y was obtained.

Further, regarding the sample prepared by the above-described method, the thickness of the Ni layer, the thickness of the Ni—Fe alloy layer (Ni—Fe layer), and the thickness of the Ni—Co alloy coating layer (Ni—Co alloy) were measured by cross section SEM-EDX. Measurement of the thicknesses was performed in the above-described procedure. An area with an Fe concentration of 8% or less was regarded as the Ni layer. For the above evaluation, the average of five points in a 10,000-fold visual field was calculated.

(4) Measurement of Charge Transfer Resistance of Surface

Each sample was kept at a constant potential for 20 days at the potential of manganese dioxide of the positive electrode (0.3 V vs. Hg/HgO) at 60° C., in a 35% KOH aqueous solution. Thereafter, the impedance value at a frequency of 0.1 Hz was evaluated for each sample by an electrochemical impedance method. At this time, a sample having an impedance value of less than 50Ω was evaluated as good (G), and a sample having an impedance of 50Ω or more was evaluated as defective (B).

(5) Liquid Leakage Resistance Evaluation

After performing press work on the sample into the shape of a cylindrical can, the can side surface portion was cut out. The sample cut from the can side surface portion was held in a 35% KOH aqueous solution at 60° C. at a constant potential for 20 days at a potential (0.3 V vs Hg/HgO) of manganese dioxide at the positive electrode. Thereafter, the amounts of Ni, Co, and Fe in the aqueous solution were evaluated by ICP. At this time, a sample in which the sum of the elution amounts of Ni, Co, and Fe was less than 30 mg/L was evaluated as good (G), and a sample of 30 mg/L or more was evaluated as defective (B).

(6) Workability Evaluation

After performing press forming on the sample into the shape of a cylindrical can, the sample was cut out, and a certain point on the can inner surface side of the sample was subjected to surface EPMA mapping at a magnification of 200-fold to evaluate whether or not the base metal was exposed. In the press forming, the sample was punched to a blank diameter of 52 mmφ, drawing was performed several times so that the Ni—Co alloy coating layer was on the inside of the container, and by re-drawing, forming was performed to obtain a cylindrical container having an outer diameter of 15 mm and a height of 40 mm. In the surface EPMA mapping, measurement was performed using JXA-8230 manufactured by JEOL Ltd. From the mapping data, a sample in which the area of a portion having a Fe mass concentration of 95% to 100% was less than 1% was evaluated as good (G), and a sample with 1% or more was evaluated as defective (B).

The results are shown in Tables 2 and 3.

In Examples 1 to 9 manufactured so that the total adhesion amounts of Ni and Co, the atomic concentration of Co on the surface of the Ni—Co alloy coating layer (surface Co concentration), the Co concentration gradient, and the Ni layer thickness were set according to the present invention, both the battery performance and workability showed good results.

On the other hand, in Comparative Example 1 in which the total adhesion amount of Ni was small, the Ni layer thickness was thin, and Fe was diffused to the surface layer of the coating layer. Therefore, Comparative Example 1 was inferior in workability.

In Comparative Examples 2 and 3, since the total adhesion amount of Co was out of the range, the surface Co concentration was out of the invention range, and the Co concentration gradient was also out of the invention range. Therefore, Comparative Examples 2 and 3 were inferior in both the battery performance and workability.

In Comparative Example 4, since the annealing temperature was too high, the diffusion of Co and Fe proceeded excessively, the Ni layer was not formed, and the workability was inferior. Contrary to this, in Comparative Example 5, since the annealing temperature was too low, the surface Co concentration was high, and the liquid leakage resistance was inferior.

In Comparative Examples 6 and 7, since the annealing time was out of the above-described preferable range, the Co concentration gradient was out of the invention range, and the workability was inferior.

In Comparative Examples 8 and 9, the diffusion of Co and Fe proceeded excessively due to BAF annealing, the Ni layer was depleted, and Fe was diffused to the surface layer of the coating layer. Therefore, the Co concentration gradient y in the coating layer in the depth direction was low, and the Ni layer was not formed, so that Comparative Examples 8 and 9 were inferior in workability. Note that "-" in the column of the thickness of the Ni—Co alloy coating layer and the column of the thickness of the Ni—Fe alloy layer in Table 2 indicates that since the Ni—Fe—Co ternary alloy layer was in a state of being mixed at least partially, the Ni—Co alloy coating layer and the Ni—Fe alloy layer could not be distinguished from each other, and the thicknesses thereof could not be measured.

In Comparative Example 10, both the surface Co concentration and the Co concentration gradient were out of the invention ranges, and both the liquid leakage resistance and the workability were inferior. It is presumed that this is because the composition of the plating bath was inappropriate and the amount of strain of the coating layer before the alloying treatment was small.

TABLE 2

| | | Steel sheet | Coating total adhesion amount [g/m²] | | Annealing temperature [° C.] | Time [sec] | Surface Co concentration [at %] | Co concentration gradient y [mass %/μm] | Ni layer thickness [μm] | Ni—Co layer thickness [μm] | Ni—Fe layer thicknes [μm] |
|---|---|---|---|---|---|---|---|---|---|---|---|
| | | | Ni | Co | | | | | | | |
| Example | 1 | A | 12.7 | 1.3 | 720 | 20 | 46 | 170.9 | 0.8 | 0.5 | 0.9 |
| | 2 | A | 12 | 0.5 | 720 | 20 | 34 | 88.5 | 1.2 | 0.2 | 0.5 |
| | 3 | A | 11.7 | 1.7 | 720 | 20 | 45 | 200.8 | 0.6 | 0.7 | 0.9 |
| | 4 | A | 8.9 | 0.9 | 720 | 20 | 41 | 124.9 | 0.5 | 0.6 | 0.5 |
| | 5 | B | 17.8 | 1.2 | 760 | 16 | 45 | 110 | 2.3 | 0.5 | 0.7 |
| | 6 | A | 13.4 | 2.3 | 720 | 10 | 68 | 395.1 | 1.2 | 0.7 | 0.3 |
| | 7 | B | 13.4 | 0.5 | 860 | 35 | 21 | 51 | 0.4 | 0.8 | 1.1 |
| | 8 | B | 17.8 | 2.3 | 800 | 10 | 35 | 110 | 1.6 | 1 | 0.9 |
| | 9 | B | 17.8 | 0.2 | 800 | 10 | 20 | 59 | 1.9 | 0.4 | 0.9 |
| Comparative Example | 1 | A | 6.3 | 1.1 | 720 | 20 | 49 | 157.9 | 0.2 | 0.9 | 0.9 |
| | 2 | A | 13.4 | 0.1 | 720 | 20 | 15 | 23.2 | 1.8 | 0.02 | 0.5 |
| | 3 | A | 13.4 | 3 | 720 | 20 | 72 | 456 | 1.1 | 1.2 | 0.8 |
| | 4 | A | 13.4 | 1.2 | 920 | 20 | 30 | 28.6 | 0 | — | — |
| | 5 | A | 13.4 | 1.3 | 600 | 20 | 75 | 153.9 | 0.7 | 0.4 | 1 |
| | 6 | A | 13.4 | 1.2 | 720 | 5 | 60 | 568.3 | 1.4 | 0.3 | 0.4 |
| | 7 | A | 13.4 | 1.2 | 720 | 50 | 30 | 24.7 | 0.4 | 1 | 0.9 |
| | 8 | A | 8.9 | 1.8 | 700 | 3600 | 8 | 7.7 | 0 | — | — |
| | 9 | A | 8.9 | 1.8 | 700 | 3600 | 27 | 22.6 | 0 | — | — |
| | 10 | A | 13.4 | 2.3 | 720 | 10 | 80 | 501 | 1.4 | 0.5 | 0.3 |

TABLE 3

| | | Charge transfer resistance | Liquid leakage resistance | Workability | Total |
|---|---|---|---|---|---|
| Example | 1 | G | G | G | G |
| | 2 | G | G | G | G |
| | 3 | G | G | G | G |
| | 4 | G | G | G | G |
| | 5 | G | G | G | G |
| | 6 | G | G | G | G |
| | 7 | G | G | G | G |

TABLE 3-continued

|  |  | Charge transfer resistance | Liquid leakage resistance | Workability | Total |
|---|---|---|---|---|---|
|  | 8 | G | G | G | G |
|  | 9 | G | G | G | G |
| Comparative Example | 1 | G | B | B | B |
|  | 2 | B | G | B | B |
|  | 3 | G | B | B | B |
|  | 4 | G | G | B | B |
|  | 5 | G | B | G | B |
|  | 6 | G | B | B | B |
|  | 7 | G | B | B | B |
|  | 8 | B | G | B | B |
|  | 9 | G | G | B | B |
|  | 10 | G | B | B | B |

INDUSTRIAL APPLICABILITY

As described above, the surface-treated steel sheet of the present invention has high discharge characteristics and liquid leakage resistance, and also has excellent workability. For example, when the surface-treated steel sheet of the present invention is used as a positive electrode can of an alkaline battery, the surface-treated steel sheet is less likely to crack even when worked, stably exhibits battery characteristics and liquid leakage resistance, and thus can contribute to quality improvement of the battery. Therefore, the industrial significance of the present invention is extremely great.

BRIEF DESCRIPTION OF THE REFERENCE SYMBOLS

1 . . . Steel sheet as base metal
2 . . . Coating layer
3 . . . Ni—Fe alloy layer
4 . . . Ni layer
5 . . . Ni—Co alloy coating layer
10 . . . Surface-treated steel sheet

The invention claimed is:

1. A surface-treated steel sheet comprising:
a steel sheet as a base metal; and
a coating layer including Ni, Co, Fe and impurities provided on a surface of the steel sheet as the base metal and,
wherein the coating layer includes
a Ni—Co alloy coating layer which is a region between a position where a mass concentration of Co becomes maximum and a position where the mass concentration of Co becomes 8 mass % for the first time, which are specified by performing line analysis on a cross section of the coating layer in a direction from the surface of the surface-treated steel sheet toward the steel sheet as the base metal with energy dispersive X-ray spectroscopy,
a Ni—Fe alloy layer which is a region between a position where a mass concentration of Fe becomes 8 mass % for the first time and a position where a mass concentration of Ni and the mass concentration of Fe become the same for the first time, which are specified by performing the line analysis on the cross section of the coating layer in the direction from the surface of the surface-treated steel sheet toward the steel sheet as the base metal with the energy dispersive X-ray spectroscopy, and
a Ni layer which is present between the Ni—Co alloy coating layer and the Ni—Fe alloy layer,
in the coating layer, a total adhesion amount of Co is 0.2 g/m$^2$ to 2.3 g/m$^2$, and a total adhesion amount of Ni is 8.9 g/m$^2$ or more,
the Ni layer has a thickness of 0.3 μm to 3.0 μm,
an atomic concentration of Co specified by analyzing a surface of the Ni—Co alloy coating layer with X-ray photoelectron spectroscopy is 20 at % to 70 at %, and
a Co concentration gradient y in the coating layer in a depth direction obtained by substituting Ip, $I_{1/5}$ and Δx, which are specified by performing the line analysis on the cross section of the coating layer with the energy dispersive X-ray spectroscopy, into Formula (1) is 50 mass %/μm to 400 mass %/μm, $$y=(Ip-I_{1/5})/(\Delta x) \tag{1}$$

where,
Ip: a peak mass concentration of Co, specified by the line analysis,
$I_{1/5}$: a mass concentration of ⅕ of Ip, $$\Delta x=X_{1/5}-Xp,$$

Xp: a depth by unit μm of a position where the mass concentration of Co is Ip, specified by the line analysis,
$X_{1/5}$: a depth by unit μm of a position where the mass concentration of Co becomes $I_{1/5}$ for the first time on a side closer to the steel sheet as the base metal than Xp, specified by the line analysis, and
an origin of depth measurement for both $X_{1/5}$ and Xp is set to the surface of the coating layer.

2. The surface-treated steel sheet according to claim 1, wherein the total adhesion amount of Co in the coating layer is 0.4 g/m$^2$ or more.

3. The surface-treated steel sheet according to claim 1, wherein the thickness of the Ni layer is 2.0 μm or less.

4. The surface-treated steel sheet according to claim 1, wherein the total adhesion amount of Co in the coating layer is 0.4 g/m$^2$ to 1.8 g/m$^2$.

5. The surface-treated steel sheet according to claim 1, wherein the total adhesion amount of Ni in the coating layer is 9.5 g/m$^2$ to 17 g/m$^2$.

6. The surface-treated steel sheet according to claim 1, wherein the atomic concentration of Co on the surface of the Ni—Co alloy coating layer is 30 at % to 60 at %.

7. The surface-treated steel sheet according to claim 1, wherein the Co concentration gradient y in the coating layer in the depth direction is 110 to 300.

8. The surface-treated steel sheet according to claim 2, wherein the thickness of the Ni layer is 2.0 μm or less.

9. The surface-treated steel sheet according to claim 3, wherein the total adhesion amount of Co in the coating layer is 0.4 g/m$^2$ to 1.8 g/m$^2$.

10. The surface-treated steel sheet according to claim 3, wherein the total adhesion amount of Ni in the coating layer is 9.5 g/m$^2$ to 17 g/m$^2$.

11. The surface-treated steel sheet according to claim 3, wherein the atomic concentration of Co on the surface of the Ni—Co alloy coating layer is 30 at % to 60 at %.

12. The surface-treated steel sheet according to claim 3, wherein the Co concentration gradient y in the coating layer in the depth direction is 110 to 300.

* * * * *